United States Patent Office 2,976,210
Patented Mar. 21, 1961

2,976,210

PEST CONTROL COMPOSITIONS CONTAINING OXIDIZED POLYETHYLENE WAX

John N. Cosby, Morristown, and Merrill M. Darley, Basking Ridge, N.J., assignors to Allied Chemical Corporation, a corporation of New York No Drawing. Filed Oct. 30, 1957, Ser. No. 693,263

5 Claims. (Cl. 167—42)

This invention relates to pest and growth control compositions, and more particularly to such compositions having enhanced or prolonged effectiveness when applied to surfaces such as plant surfaces, screens, glass and the like.

It is common practice to apply pest controlling compositions to surfaces such as plant leaves and branches to control various noxious organisms, or to control the growth of the plant. A large proportion of such applications are made in the form of sprays in which the toxicant or control agent is combined with other adjuvants and water, in the form of emulsions or dispersions, usually containing surface active agents.

Such control compositions, while effective when initially sprayed, are often washed off by rainfall, or are otherwise removed from the surface to be protected, so that their effectiveness is often short lived. Such conditions require repeated application of control composition to obtain satisfactory pest or growth control, involving additional labor, expense and sometimes injury to the host plants.

Many attempts have been made in the past to produce improved pest control compositions which would provide prolonged effect on the pests, or plants, and specifically, which would resist weathering and continue to give protection or growth control to the plant or protection to other exposed surfaces after heavy rainfalls.

Thus, many so-called "stickers" have been developed for addition to pest control sprays, and a number of such stickers are commercially available and are effective to greater or lesser degrees in improving the adherence of the control composition to the surface to be treated. Because of the combination of properties required in such "sticking agents," however, most such agents are unsatisfactory in one or more respects. Thus, the sticking agent must be inert toward, and non-reactive with, the pest control component; it must be dispersible in, and compatible with, the pest control composition to give a stable, sprayable, aqueous formulation. On the other hand, its adhesive properties with respect to both the plant and pest control agent must be such that, while acting as a sticker, it does not interfere with the "breathing" of the plant, nor with the toxic or regulant action of the pest control agent, which, in many cases, is by direct contact with the pest organism or with the plant parts, and while the sticking agent must be soluble or emulsifiable in the aqueous spray composition, it must be resistant to water, in the form of rain, after application.

We have now found that pest and growth control spray compositions having enhanced and greatly prolonged periods of activity and increased resistance to weathering, particularly to the action of rain, are obtained according to our invention wherein an aqueous dispersion of a readily emulsifiable, oxidized polyethylene wax having an average molecular weight between about 600 and about 5,000 and melting point between about 90° C. and about 105° C. is incorporated with the pesticidal spray composition prior to its application to the surface to be protected.

An important feature of our invention is the fact that the oxidized polyethylene wax emulsion may be employed with all types of sprayable pest control compositions, applied as dispersions of wettable spray powders or of emulsifiable concentrates, and meets the stringent requirements of an effective sticker mentioned above, and to a surprising extent, the apparently paradoxical requirements of emulsifiability before application, and resistance to removal by rain after deposit on the surface to be protected. Moreover, our emulsifiable polyethylene wax-containing spray compositions include formulations employing all types of pest control toxicants whether insecticides, miticides, fungicides, or herbicides and also is effective with beneficial plant growth regulants, such as the recently developed maleic hydrazide compositions. Thus, wherever the term pest control compositions is used herein, it should be understood to include all the foregoing.

Emulsifiable, oxidized polyethylene wax materials especially suitable for use in the compositions of our invention are described in co-pending application Serial No. 515,770 of Michael Erchak, Jr. filed June 15, 1955, according to which normally solid, hard, waxy polymers of ethylene, which are saturated aliphatic compounds characterized by a recurring —$CH_2$— group and which have average molecular weights between about 1,000 and about 3,000, especially polyethylene/alkanol telomers of this character, are subjected, in the liquid phase, to the action of an oxygen-containing gas to cause reaction of at least about 5 pounds of oxygen per 100 pounds of wax, preferably between about 5 pounds and about 17 pounds of oxygen, per 100 pounds of wax, i.e. to provide an oxidized polyethylene wax containing at least about 3%, preferably between about 3% and about 9% of oxygen by weight, based on the weight of the oxidized wax, and acid numbers of not more than about 50, preferably between about 10 and about 45. The oxidized polyethylene/isopropanol telomer waxes prepared according to the above method containing between about 3% and about 6% oxygen and having average molecular weights between about 1,000 and about 2,000, melting points between about 90° C. and about 110° C., acid numbers between about 10 and about 20, are especially preferred. These oxidized wax products are characterized by an extremely low incidence of, or in many cases substantially complete absence of ester groups. Thus, the saponification number (which measures both acid and ester groups) is substantially identical to or only slightly greater than the acid number (which measures only acid groups) so that these products all have an extremely low or zero ester number (saponification number minus acid number) and have ratios of saponification number to acid number between about 1 and about 1.5.

The waxy ethylene polymers which are oxidized as above described, may themselves be prepared by any suitable known methods, for example by subjecting ethylene, either alone, or in the presence of a co-reactant to temperatures between about 150° C. and about 300° C. and pressures ranging from about 500 p.s.i. to about 7,000 p.s.i. as disclosed in U.S. Patents 2,683,141 and 2,504,400 of Michael Erchak, Jr. Oxidation of the waxy polymers of ethylene may result in oxidized waxes having average molecular weights somewhat less than those of the original waxes. Accordingly, the oxidized polyethylene waxes used in our invention may have average molecular weights between about 600 and about 5,000. Those having average molecular weights between about 1,000 and about 2,000 being preferred.

In preparing the pest control spray compositions of our invention, an aqueous emulsion of the oxidized polyethylene wax of the character above described is preferably prepared separately for addition to the pest control dispersion. However, in the case of the so-called "emulsifiable concentrates," i.e. pest control agents dissolved in an organic solvent such as xylene and containing emulsifying agents, the wax and the emulsifiable concentrate may be simultaneously dispersed in water as described hereinafter.

The aqueous dispersion of the readily emulsifiable oxidized polyethylene wax may be prepared in any suitable manner which insures adequate dispersion. It may be, and preferably is, considerably more concentrated than required in the finished pesticide composition, and this concentration may vary as convenience dictates. In general the dispersion may be prepared by first melting the wax together with a higher fatty acid, for example a $C_{12}$ to $C_{20}$ saturated aliphatic acid, then, with the temperature between about 120° C. and about 130° C., slowly adding a volatile amine such as morpholine, methoxy propyl amine, 2-amino-2-methyl-1-propanol or the like. The hot mixture of wax and emulsifying agent is then added gradually with vigorous agitation, to water which has been heated to just below boiling (e.g. 95–99° C.), preferably in such a manner that the hot wax stream spirals down the vortex formed by the agitation, and becomes emulsified as it blends into the water. The emulsion may then be cooled, and remains stable after cooling.

A suitable formula for the emulsified oxidized polyethylene wax is given below:

|  | By Weight | |
|---|---|---|
|  | Parts | Percent |
| Oxidized Polyethylene wax | 30 | 16.7 |
| Fatty Acid | 6 | 3.3 |
| Volatile amine | 6 | 3.3 |
| Water | 138 | 76.7 |
|  | 180 | 100.0 |

Water content may be varied as desired. However, at least about 2 parts of water per part of wax are required to form a satisfactory emulsion concentrate. Such concentrates may be diluted with additional water to any desired degree of dilution.

About equal parts of fatty acid and volatile amine should be used as emulsifier and the ratio of combined emulsifier to wax is preferably maintained between about 0.3:1 and about 0.5:1, by weight.

The pest control composition to be incorporated with the wax emulsion, either in the form of a dispersible dust, i.e. a so-called "wettable spray powder," or in the form of a concentrated solution of the toxicant in a solvent and emulsifying agent, i.e. an "emulsifiable concentrate" may be separately formed into an aqueous dispersion in the usual way, as by the addition of water, and the desired quantity of the wax emulsion may be added thereto.

If the pest control composition is in the form of an "emulsifiable concentrate," the wax and the emulsifiable concentrate may be dispersed in water simultaneously, for example by heating the emulsifiable concentrate and mixing it with molten wax, and then blending the wax-emulsifiable concentrate mixture with water.

Relatively small quantities of oxidized polyethylene wax are effective in our new aqueous pest control dispersions-quantities as low as about 0.1 lb. per 100 gallons providing enhanced effectiveness and sticking properties to the pest control composition. In general we prefer to use between about 0.1 lb. and about 1.0 lb. of wax per 100 gallons of aqueous dispersion.

Quantities of emulsifying agents required will depend somewhat upon the agent used. In the case of the amine-fatty acid emulsifiers, a satisfactory quantity is between about 30% and about 50% based on the weight of the oxidized wax.

The following specific examples further illustrate our invention. Parts are by weight except as otherwise noted.

Example I

An aqueous dispersion of emulsifiable, oxidized polyethylene/isopropanol telomer wax, containing about 3% oxygen by weight, having a melting point of about 99°–100° C. (ASTM–D–87), an acid number of about 14–17, an ester number of zero, a density of about 0.92 and an average molecular weight between about 1200 and about 1500, was prepared in the formula given below:

|  | Parts | Percent |
|---|---|---|
| Emulsifiable polyethylene wax | 40 | 33.34 |
| Oleic acid | 8 | 6.66 |
| Morpholine | 8 | 6.66 |
| Water | 64 | 53.34 |
|  | 120 | 100.00 |

The above composition had a density of about 0.98.

The emulsion was prepared by melting the oxidized polyethylene/isopropanol telomer wax with the oleic acid, and, with the melt temperature at about 120°–130° C. adding the morpholine slowly. The water was heated to 95°–99° C. (just below boiling) and then, with rapid stirring, the melt was added to the hot water gradually at the top of the vortex formed by the stirring action, whereupon the melt spiraled down the vortex and became emulsified. After emulsification, the mixture was allowed to cool with gentle stirring.

A commercial 50% DDT wettable spray powder was dispersed in water to provide (a) ½ pound per 100 gallons of the 50% DDT powder. With one 100 gallon portion (b) of this dispersion was mixed one quart of the oxidized polyethylene wax emulsion described above (containing about .67 pound of wax solids); to another portion (c) was added ½ pound of a commercial "sticker" mixture A ("Filmfast") containing 40 percent skim milk powder, 20% flour paste, 20% bentonite and 20% kaolin; to another portion was added (d) ¼ pound of a second commercial "sticker" B (Colloidal Z–1) a silica-soap preparation. The four mixtures were tested as follows:

Sets of 6 inch petri dish halves were sprayed uniformly with the spray mixtures and allowed to dry for 24 hours in a greenhouse. Then three of each set were subjected to 1 inch of artificial rain, and 3 were left without further treatment. After the deposits were again dry, adult house flies were confined over them by means of 4½ inch hemispherical wire cages. Observations of "knockdown" after 4 hours and kill after 24 hours are recorded in Table I below:

TABLE I

*Effect of oxidized polyethylene wax and commercial stickers on knockdown and kill of houseflies by ½ lb./100 gal. of 50% ddt with and without rain*

| Per 100 Gallons | No Rain | | 1″ Rain | | 3″ Rain | |
|---|---|---|---|---|---|---|
|  | Percent KD, 4 Hr. | Percent Kill, 24 Hr. | Percent KD, 4 Hr. | Percent Kill, 24 Hr. | Percent KD, 4 Hr. | Percent Kill, 24 Hr. |
| 50% DDT, ½ lb | 90.2 | 100 | 0 | 2.1 | 0 | 0 |
| Same+Oxidized Polyethylene Wax Emul., 1 qt | 98.2 | 100 | 22.5 | 97.2 | 1.7 | 84.8 |
| Same+"Filmfast", ½ lb | 62.1 | 100 | 0 | 26.3 | 0 | 7.8 |
| Same+"Colloidal Z–1", ¼ lb | 65.0 | 100 | 1.9 | 30.7 | 0 | 16.3 |
| Check (No treatment) | 0 | 0 |  |  |  |  |

Example 2

A 50% DDT wettable powder was formed into an aqueous suspension as in Example 1, containing 4 pounds of the 50% DDT powder per 100 gallons. To separate portions of the DDT suspension were added the following, the quantities being based on 100 gallons of spray composition:

1 quart oxidized polyethylene wax emulsion having the composition shown in Example 1, i.e. containing about 0.67 pound of wax solids.
1 pound of a commercial "sticker" C (Thiokol ZM-198).
1 quart of a commercial "sticker" D (National Sticker), a solution of water-insoluble synthetic resins in methanol.

Four sets of glass plates were then sprayed for 1 second, each set with one of the four dispersions, and the resulting deposits were allowed to dry for 3 days. The plates representing each treatment were then subjected to 6 inches of artificial rain and three plates of each were given no rain treatment. After the deposits were again dry, houseflies were confined over them by means of 4½ inch hemispherical wire cages. Observations of percent "knockdown" after 2, 3, 4 and 5 hours were made and of percent kill after 24 hours. Results are shown in Table II below:

TABLE II

*Effect of oxidized polyethylene wax and stickers C & D on knockdown and kill of houseflies by 4 lbs./100 gal. 50% ddt, with and without rain*

| Per 100 Gallons | Inches Rain | Percent Knockdown After— | | | | Percent Kill, 24 Hr. |
|---|---|---|---|---|---|---|
| | | 2 Hr. | 3 Hr. | 4 Hr. | 5 Hr. | |
| 50% DDT, 4 lbs | 0 | 83.4 | 95.5 | 100 | | 100 |
| Same+Ox. PE Wax Emul., 1 qt | 0 | 89.8 | 97.5 | 100 | | 100 |
| Same+Thiokol ZM-198, 1 lb | 0 | 81.0 | 89.6 | 97.6 | 100 | 100 |
| Same+National Sticker, 1 qt | 0 | 73.2 | 83.8 | 97.5 | 99.5 | 100 |
| 50% DDT, 4 lbs | 6 | 75.2 | 78.3 | 90.7 | 93.8 | 100 |
| Same+Ox. PE Wax Emul., 1 qt | 6 | 90.8 | 96.7 | 100 | | 100 |
| Same+Thiokol ZM-198, 1 lb | 6 | 5.7 | 7.9 | 3.5 | 6.6 | 64.2 |
| Same+National Sticker, 1 qt | 6 | 54.3 | 63.8 | 76.3 | 80.7 | 100 |
| Check (No treatment) | | 0 | 0 | 0 | 0 | 4.4 |

Example 3

A sprayable emulsion was prepared from an emulsifiable concentrate containing 50% by weight of 2,4-dichlorophenyl benzene sulfonate ("Genite EM 923") miticide in solution in 45% xylene together with 5% of an alkyl aryl polyether alcohol emulsifying agent (Triton X-155) by adding the concentrate to water in the ratio of 1½ pints of concentrate per 100 gallons of water. This was fortified by the addition of a 50% tetraethylpyrophosphate concentrate in the ratio of ¼ pint per 100 gallons.

A second emulsion was prepared in a similar manner except that the 2,4-dichlorophenyl benzene sulfonate concentrate contained 5% of its weight of oxidized polyethylene wax of the character specified in the foregoing examples, dispersed in the concentrate solution. Dispersion of the wax was accomplished by heating the concentrate to approximately 150° F., adding wax, mixing to dissolve the wax, and then cooling to cause dispersion of the wax in the concentrate which was then added to the water to form the sprayable emulsion.

A third emulsion was prepared similar in all respects to the first except that 5% of its weight of a chlorinated lecithin (ALCOLEC SCL 85) recommended by its manufacturer as an adhesive for pesticidal oils, was added to the 2,4-dichlorophenyl benzene sulfonate prior to its dispersion in water.

Each of the three above emulsions was applied, by spraying, to bean plants infested with two-spotted spider mites. Observation of the plants 3 days after application of the sprays showed the results given Table III below:

TABLE III

*Effect of oxidized polyethylene wax in emulsion concentrate sprays on control of two-spotted mites on bean plants*

| Per 100 Gallons | No. Present | Mite eggs Killed | |
|---|---|---|---|
| | | No. | Percent |
| "Genite EM-923," 1½ pints<br>TEPP, ¼ pint | 56 | 21 | 37.5 |
| Same with 5% Oxidized Polyethylene Wax dissolved in "Genite EM-923" | 96 | 90 | 93.7 |
| Same with 5% "Alcolec" dissolved in "Genite EM-923" | 36 | 23 | 63.9 |

Example 4

An aqueous dispersion of oxidized polyethylene wax of the character specified in the foregoing examples was prepared using the technique described under Example 1 above and had the following composition:

Oxidized polyethylene wax _____ 30
Oleic acid _____ 6
Morpholine _____ 6
Water _____ 138

A 50% DDT wettable spray powder was dispersed in water in ratios of ½ pound and 1 pound per 100 gallons, respectively, and these dispersions were tested alone and with the addition of 1 quart per 100 gallons of the oxidized polyethylene wax emulsion described above, against Southern Armyworm 5th Instar larvae.

In this test twenty bean leaves trimmed to 1½ inch squares were sprayed with the different dispersions. After drying overnight, half of the leaves receiving each spray treatment were subjected to 3 inches of artificial rain. When these leaves were dry, all were infested with 1 larva each. The results of mortality and feeding records made 2 and 3 days later are shown in Table IV below:

TABLE IV

| Treatment (Per 100 Gals.) | "Rain," inches | Dead | | Percent Feeding |
|---|---|---|---|---|
| | | No. | Percent | |
| 1. DDT 50% SP, 1 lb | 0 | 10 | [1]100 | [1]4.3 |
| | 3 | 7 | [1]70 | [1]18.0 |
| 2. DDT 50% SP, 1 lb.+Ox. PE Wax Dispersion 1 qt | 0 | 10 | [1]100 | [1]4.4 |
| | 3 | 10 | [1]100 | [1]8.3 |
| 3. DDT 50% SP, ½ lb | 0 | 10 | [2]100 | [2]7.1 |
| | 3 | 5 | [2]50 | [2]46.8 |
| 4. DDT 50% SP, ½ lb.+Ox. PE Wax Dispersion, 1 qt | 0 | 10 | [2]100 | [2]5.4 |
| | 3 | 10 | [2]100 | [2]28.3 |
| 5. Check—no treatment | | 0 | 0 | [1]35.7 / [2]100 |

[1] After 2 days.
[2] After 3 days.

Example 5

To test the action of oxidized polyethylene wax in prolonging the effectiveness of a miticide, bean plants in the two leaf stage, heavily infested with two spotted spider mite (active stage) were dipped into and then withdrawn from spray mixtures containing various amounts of a 50% 2,4-dichlorophenyl benzene sulfonate concentrate in 45% xylene together with 5% of alkyl aryl polyether alcohol emulsifying agent, some of which contained quantities of the oxidized polyethylene wax emulsion having the composition described in Example 4. Counts of living and dead mites were made 2 to 3 days later, with results shown in Table V below:

TABLE V

| Per 100 Gallons—Genite EM-923 | Oxidized Polyethylene Wax Dispersion | Percent Kill Active Stages |
|---|---|---|
| 1 quart | 0 | 55.7 |
| Do | 1 pint | 90.8 |
| Do | 1 quart | 95.5 |
| Do | 2 quarts | 99.6 |
| 0 | do | 3.7 |
| 1½ pints | 0 | 25.9 |
| Do | 1 pint | 45.3 |
| Do | 1 quart | 60.6 |
| Do | 2 quarts | 46.7 |
| 0 | do | 9.4 |
| 1 Pint | 0 | 12.6 |
| Do | 1 pint | 25.6 |
| Do | 1 quart | 31.2 |

*Example 6*

To separate portions of 2,4-dichlorophenyl benzene sulfonate/xylene emulsion concentrate of the composition specified in Example 5, heated to approximately 150° F., were added varying small amounts of molten oxidized polyethylene wax of the character specified in the foregoing examples. The mixtures were then cooled and dispersed in water. Bean plants in the 2-leaf stage, heavily infested with two-spotted spider mites were dipped into and withdrawn from the dispersions, and counts of living and dead mites made before dipping and 2 to 3 days later, with results as shown in Table VI below:

TABLE VI

| Treatment (Per 100 Gallons) | Percent Kill After 3 Days | |
|---|---|---|
| | Test No. 1 | Test No. 2 [1] |
| 1. Genite EM-923, 1 qt | 55.7 | 50.8 |
| 2. Genite containing 0.5% wax, 1 qt | 74.4 | 70.8 |
| 3. Genite containing 1% wax, 1 qt | 77.8 | 77.8 |
| 4. Genite containing 2% wax, 1 qt | 100 | 80.0 |
| 5. Genite containing 3% wax, 1 qt | 98.5 | 86.5 |
| 6. Genite containing 4% wax, 1 qt | 98.6 | 88.7 |
| 7. Genite containing 5% wax, 1 qt | 97.2 | 81.9 |
| 8. Check—no treatment | 8.4 | 23.1 |

[1] Made 3 days after Test No. 1.

*Example 7*

Apple twigs bearing overwintering mite eggs were brought into the greenhouse, the eggs were counted and the twigs sprayed with aqueous dispersions of two effective mite ovicides with and without addition of varying amounts of oxidized polyethylene wax of the character specified in the foregoing examples. One group of dispersions was prepared from a 50% 2,4-dichlorophenyl benzene sulfonate concentrate (Genite EM-923), of the composition described in Example 3 above, the other from a concentrate containing 20% p-chlorophenyl-p-chlorobenzene sulfonate ("Ovex") dissolved in 76% xylene together with 4% of Triton X-155 emulsifying agent. The concentrates were made up into aqueous dispersions by mixing them with water in the ratio of 1½ pints of concentrate to 100 gallons of water. Before adding water, portions of the concentrate were mixed with varying proportions of oxidized polyethylene wax by mixing the molten wax with the emulsifiable concentrate, heating to about 150° F. and cooling. After spraying the twigs, ample time (about 10 days) was allowed to elapse for unaffected eggs to hatch, then the number of unhatched eggs was counted with the results shown in Table VII below:

TABLE VII

| Treatment (Per 100 Gals.) | Date Twigs Collected | Sprayed | No. Eggs | Unhatched No. | Percent |
|---|---|---|---|---|---|
| 1. Genite EM-923, 1½ pints | 2/23 | 2/24 | 239 | 107 | 44.8 |
| 2. Genite EM-923, 1½ pints+ 1% Ox. P. E. Wax | 2/23 | 2/24 | 235 | 131 | 55.8 |
| 3. Genite EM-923, 1½ pints+ 2% Ox. P. E. Wax | 2/23 | 2/24 | 210 | 120 | 57.1 |
| 4. Genite EM-923, 1½ pints+ 3% Ox. P. E. Wax | 2/23 | 2/24 | 185 | 108 | 58.3 |
| 5. Genite EM-923, 1½ pints+ 5% Ox. P. E. Wax | 2/23 | 2/24 | 209 | 123 | 58.9 |
| 6. Genite EM-923, 1½ pints | 2/23 | 2/28 | 232 | 146 | 62.9 |
| 7. Genite EM-923, 1½ pints+ 1% Ox. P. E. Wax | 2/23 | 2/28 | 220 | 154 | 70.0 |
| 8. Genite EM-923, 1½ pints+ 2% Ox. P. E. Wax | 2/23 | 2/28 | 264 | 194 | 73.5 |
| 9. Genite EM-923, 1½ pints+ 3% Ox. P. E. Wax | 2/23 | 2/28 | 202 | 165 | 81.6 |
| 10. Genite EM-923, 1½ pints+ 5% Ox. P. E. Wax | 2/23 | 2/28 | 225 | 174 | 77.4 |
| 11. Ovex 20% EM, 1½ pints | 2/23 | 2/28 | 215 | 96 | 44.5 |
| 12. Ovex 20% EM, 1½ pints+ 5% Ox. P. E. Wax | 2/23 | 2/28 | 175 | 107 | 61.2 |

*Example 8*

Plots of potato foliage in a field were sprayed twice, the second spraying 14 days after the first, with aqueous dispersions of a mixture of four different commercial pesticides with and without the addition of 1 pint per 100 gallons of an oxidized polyethylene wax emulsion having the composition set forth in Example 4. Counts of various insects lodged on the foliage 2, 5 and 12 days after the second spraying were made by sweeping with an insect net, with results as shown in Table VIII below:

TABLE VIII

| Treatment (Per 100 Gals.) | Count Date | No. Per 50 Sweeps | | | |
|---|---|---|---|---|---|
| | | FB | PB | Aphids | LH |
| 1. DDT 50% SP, 1 lb., Dithane [2] 1 quart, Zinc Sulfate 1 lb., Hydrated Lime ½ lb. | [1] 7/29 | 285 | 30 | 16 | 13 |
| | 8/2 | 371 | 26 | 69 | 2 |
| | 8/5 | 418 | 14 | 57 | 2 |
| | 8/12 | 904 | 129 | 568 | 9 |
| 2. Same as above+Oxidized Polyethylene wax dispersion, 1 pint | [1] 7/29 | 95 | 38 | 17 | 7 |
| | 8/2 | 167 | 21 | 54 | 2 |
| | 8/5 | 534 | 13 | 53 | 3 |
| | 8/12 | 639 | 20 | 362 | 10 |
| 3. Check—no treatment | [1] 7/29 | 847 | 59 | 19 | 21 |
| | 8/2 | 1,337 | 61 | 40 | 20 |
| | 8/5 | 1,413 | 47 | 25 | 21 |
| | 8/12 | 1,897 | 23 | 151 | 82 |

[1] Day before second application was made.
[2] Dithane=a metallic ethylene bis dithiocarbamate emulsifiable concentrate.
FB=potato flea beetle; PB=miscellaneous plant bugs; LH=potato leafhopper.

*Example 9*

Potted apple seedlings were sprayed with aqueous dispersions of two commercial fungicides "Captan" (50% N - trichloromethylmercapto-4-cyclohexene-1,2-dicarboxamide wettable powder), and "Thiram" (50% tetramethylthiuram disulfide wettable powder) with and without addition of oxidized polyethylene wax emulsion of the composition specified in Example 4. After the spray deposits had dried, the plants were subjected to a 2 inch artificial rain, then sprayed with a suspension of apple scab disease spores, held for a period of about 2 days in a moist chamber to incubate the disease and then held in a greenhouse for 12 days when they were examined for infection, with results as shown in Table IX below:

TABLE IX

| Treatment (Per 100 Gals.) | "Rain," inches | Apple Scab Infection | | |
|---|---|---|---|---|
| | | Plants | Leaves | Percent Leaf Area |
| 1. "Captan," 1 lb | 2 | 3 | 10 | 45 |
| 2. Same+Ox. P.E. wax disp., 1 qt | 2 | 3 | 5 | 16 |
| 3. "Thiram", 1 lb | 2 | 3 | 9 | 26 |
| 4. Same+Ox. P.E. wax disp., 1 qt | 2 | 3 | 7 | 9 |
| 5. Check—no fungicide | | 3 | 12 | 48 |

*Example 10*

In a test similar to that described in Example 9 above, three apple seedlings which each received a different spray treatment but no "rain" were included with results as shown in Table X below:

TABLE X

| Treatment (Per 100 Gals.) | "Rain," inches | Apple Scab Infection | | |
|---|---|---|---|---|
| | | Plants | Leaves | Percent Leaf Area |
| 1. "Captan, 1 lb | 0 | 1 of 3 | 2 | 9 |
| | 2 | 3 of 3 | 6 | 23 |
| 2. Same+Ox. P.E. wax disp., 1 pint | 0 | 1 of 3 | 1 | 3 |
| | 2 | 1 of 3 | 1 | 1 |
| 3. "Thiram", 1 lb | 0 | 0 of 3 | 0 | 0 |
| | 2 | 3 of 3 | 6 | 32 |
| 4. Same+Ox. P.E. wax disp., 1 pint | 0 | 0 of 3 | 0 | 0 |
| | 2 | 0 of 3 | 0 | 0 |
| 5. Check—no fungicide | | 3 of 3 | 9 | 49 |

*Example 11*

Another series of tests, similar to those described in Example 9 above was carried out with two other commercial apple scab fungicides "Fermate" (a 75% ferric dimethyl dithiocarbamate wettable powder) and "Thylate" (tetramethylthiuram disulfide wettable powder), with and without addition of oxidized polyethylene wax emulsion of the composition set forth in Example 4, with results as shown in Table XI below (in each test the deposits were subjected to 1" of artificial rain after drying):

TABLE XI

| Treatment (Per 100 Gals.) | Apple Scab Infection | | |
|---|---|---|---|
| | Plants | Leaves | Percent Leaf Area |
| 1. "Fermate", 1½ lbs | 3 | 14 | 39 |
| 2. Same+Ox. P.E. wax disp., 1 pint | 3 | 12 | 27 |
| 3. "Thylate" 2 lbs | 3 | 15 | 50 |
| 4. Same+Ox. P.E. wax disp., 1 pint | 3 | 12 | 22 |
| 5. 2% Phenyl mercury Chloride SP, 2 lbs | 3 | 12 | 47 |
| 6. Same+Ox. P.E. wax disp., 1 pint | 3 | 2 | 4 |
| 7. Check—no fungicide | 3 | 15 | 67 |

While the above describes the preferred embodiments of our invention it will be understood that departures may be made therefrom within the scope of the specification and claims.

We claim:

1. An aqueous pest control dispersion comprising (1) a pest control agent, (2) between about 0.1 pound and 1.0 pound per 100 gallons of dispersion of a readily emulsifiable oxidized waxy polymer of ethylene characterized by recurring —$CH_2$— groups, which is the reaction product of a waxy ethylene polymer and molecular oxygen, containing between about 3% and about 9% oxygen, and having an average molecular weight between about 600 and about 5,000, a melting point between about 90° C. and about 110° C., an acid number of at least about 10 but not more than about 50 and a ratio of saponification number to acid number between about 1 and about 1.5; (3) an emulsifying agent and (4) water, said dispersion having the property when applied to weather-exposed surfaces of providing a water-resistant solid coating having prolonged pest-control activity.

2. The composition according to claim 1 wherein the oxidized waxy polymer of ethylene is an oxidized polyethylene/alkanol telomer wax containing between about 3% and about 6% oxygen.

3. An aqueous pest control dispersion comprising a homogeneous mixture of (1) a major proportion of an aqueous dispersion of a pest-control-containing wettable spray powder and (2) a minor proportion of an aqueous emulsion of a readily emulsifiable oxidized waxy polymer of ethylene characterized by recurring —$CH_2$— groups, which is the reaction product of a waxy ethylene polymer and molecular oxygen, containing about 3% oxygen and having an average molecular weight between about 1200 and 1500, an acid number of about 14–17, an ester number of zero and a melting point of about 99°–100° C. together with an emulsifying agent for the oxidized waxy-polymer of ethylene, the oxidized waxy polymer of ethylene being present in an amount between about 0.1 pound and about 1.0 pound per 100 gallons of pest control dispersion, said dispersion having the property when applied to weather-exposed surfaces of providing a water-resistant solid coating having prolonged pest-control activity.

4. A process of treating surfaces with pest control compositions which comprises applying to such surfaces an aqueous pest control dispersion comprising (1) a pest control agent; (2) a readily emulsifiable oxidized waxy polymer of ethylene characterized by recurring —$CH_2$— groups, which is the reaction product of a waxy ethylene polymer and molecular oxygen, containing between about 3% and about 9% oxygen and having an average molecular weight between about 600 and about 5,000, a melting point between about 90° C. and about 110° C., an acid number of at least about 10, but not more than about 50 and a ratio of acid number to saponification number between about 1:1 and about 1:1.5; (3) an emulsifying agent and (4) water, whereby a water-resistant solid coating having prolonged pest-control activity is formed.

5. A process for treating the surfaces of weather-exposed growing plants, with pest-control compositions which comprises applying to such surfaces an aqueous pest control dispersion comprising (1) a pest control agent; (2) a readily emulsifiable oxidized waxy polymer of ethylene characterized by recurring —$CH_2$— groups, which is the reaction product of a waxy ethylene polymer and molecular oxygen, containing between about 3% and about 9% oxygen and having an average molecular weight between about 600 and about 5,000, a melting point between about 90° C. and about 110° C., an acid number of at least about 10, but not more than about 50 and a ratio of acid number to saponification number between about 1:1 and about 1:1.5; (3) an emulsifying agent and (4) water, whereby a water-resistant solid coating on the said surfaces having prolonged pest-control activity is formed.

References Cited in the file of this patent

UNITED STATES PATENTS

| 1,082,507 | Ellis | Dec. 30, 1913 |
| 2,186,691 | Belzer | Jan. 9, 1940 |
| 2,766,214 | Erchak et al. | Oct. 9, 1956 |